(12) United States Patent
Shen et al.

(10) Patent No.: US 10,254,819 B2
(45) Date of Patent: *Apr. 9, 2019

(54) APPARATUS AND METHOD FOR ACTIVATING AND SHUTTING DOWN ENHANCED PIPELINE STAGES AND ENHANCED MODULES BASED ON PRIORITY AND PERFORMANCE REQUIREMENTS

(71) Applicant: International Business Machines Corporation, Armonk, NY (US)

(72) Inventors: Wen Bo Shen, Beijing (CN); Peng Shao, Beijing (CN); Yu Li, Beijing (CN); Xiao Tao Chang, Beijing (CN); Yi Ge, Beijing (CN); Hua Yong Wang, Beijing (CN); Huan Hao Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/224,410

(22) Filed: Jul. 29, 2016

(65) Prior Publication Data
US 2016/0335094 A1    Nov. 17, 2016

Related U.S. Application Data

(60) Continuation of application No. 14/947,823, filed on Nov. 20, 2015, now Pat. No. 9,671,856, which is a
(Continued)

(30) Foreign Application Priority Data

Jan. 25, 2008 (CN) .......................... 2008 1 0003557

(51) Int. Cl.
*G06F 1/32* (2006.01)
*G06F 9/30* (2018.01)
(Continued)

(52) U.S. Cl.
CPC .......... *G06F 1/3287* (2013.01); *G06F 9/3867* (2013.01); *G06F 9/3885* (2013.01);
(Continued)

(58) Field of Classification Search
CPC .... G06F 1/3287; G06F 9/3867; G06F 9/3885; G06F 11/30
(Continued)

(56) References Cited

U.S. PATENT DOCUMENTS 5,666,537 A    9/1997  Debnath et al.
5,951,689 A    9/1999  Evoy et al.
(Continued)

OTHER PUBLICATIONS

David Kanter, P.A. Semi's PA6T-1682M System-on-a-Chip, Real World Technologies, http://www.realworldtech.com/pa-semi/31, 2 pages, Print date Jun. 29, 2015.
(Continued)

*Primary Examiner* — David J. Huisman
(74) *Attorney, Agent, or Firm* — Suiter Swantz pc llo

(57) ABSTRACT

A method for controlling a pipeline-based processor. The method includes determining a change in a workload. The method also includes activating or shutting down, by at least one controller circuit, one or more of the plurality of enhanced pipeline stages based on at least one corresponding enhanced stage priority level of the one or more of the plurality of enhanced pipeline stages and requirements for performance of the workload. The method additionally includes activating or shutting down, by the at least one controller circuit, one or more of the plurality of enhanced modules of the particular pipeline stage based on at least one
(Continued)

corresponding priority level of the one or more of the plurality of enhanced modules of the particular pipeline stage and the requirements for the performance of the workload.

20 Claims, 9 Drawing Sheets

Related U.S. Application Data division of application No. 13/457,011, filed on Apr. 26, 2012, now Pat. No. 9,348,406, which is a continuation of application No. 12/357,910, filed on Jan. 22, 2009, now Pat. No. 9,563,259, application No. 15/224,410, filed on Jul. 29, 2016, which is a continuation of application No. 12/357,910, filed on Jan. 22, 2009, now Pat. No. 9,563,259.

(51) Int. Cl.
| | | |
|---|---|---|
| *G06F 1/3287* | (2019.01) | |
| *G06F 11/30* | (2006.01) | |
| *G06F 9/38* | (2018.01) | |
| *G06F 9/48* | (2006.01) | |
| *G06F 13/18* | (2006.01) | |

(52) U.S. Cl.
CPC ............ *G06F 9/4818* (2013.01); *G06F 11/30* (2013.01); *G06F 13/18* (2013.01); *Y02D 10/14* (2018.01)

(58) Field of Classification Search
USPC .............................................. 712/1; 713/324
See application file for complete search history.

(56) References Cited

U.S. PATENT DOCUMENTS

| | | | |
|---|---|---|---|
| 7,337,336 B2 | 2/2008 | Ferentz et al. | |
| 7,340,325 B2 | 3/2008 | Sousa et al. | |
| 7,437,581 B2 | 10/2008 | Grochowki et al. | |
| 7,549,067 B2 | 6/2009 | Tolliver | |
| 7,730,336 B2 | 6/2010 | Marinkovic et al. | |
| 7,971,043 B2 | 6/2011 | Chang et al. | |
| 9,348,406 B2 | 5/2016 | Shen et al. | |
| 9,563,259 B2 * | 2/2017 | Shen ..................... | G06F 9/3867 |
| 9,671,856 B2 * | 6/2017 | Shen ..................... | G06F 9/3867 |
| 2006/0129856 A1 | 6/2006 | Main et al. | |
| 2007/0074059 A1 | 3/2007 | Abernathy et al. | |
| 2009/0070602 A1 | 3/2009 | Ingle et al. | |
| 2009/0193424 A1 | 7/2009 | Shen et al. | |
| 2010/0049963 A1 | 2/2010 | Bell, Jr. | |
| 2010/0217961 A1 | 8/2010 | Hosoda | |
| 2016/0147288 A1 | 5/2016 | Shen et al. | |

OTHER PUBLICATIONS

Tse-Yu Yeh, Low-Power, High-Performance Architecture of the PWRficient Processor Family, PA Semi Inc. Hot Chips 18, Aug. 21, 2006, 29 pages.
Peter Bannon, The PWRficient Processor, PA Semi, Inc., Jan. 2006, 20 pages.
Mantarano et al., "A 160-MHz, 32-b, 0.5-W CMOS RISC Microprocessor", 1996, pp. 49-62.
Sartori et al., "Power Balanced Pipelines", 2012, 12 pages.
Roberto Maro, et al., Dynamically Reconfiguring Processor Resources to Reduce Power Consumption in High-Performance Processors; 2001, Power-Aware Computer Systems, pp. 1-9, vol. 2008/2001, Publisher: Springer Berlin/Heidelberg.
Hiraki et al., "Stage-Skip Pipeline: A Low Power Processor Architecture Using a Decoded Instruction Buffer", 1999, pp. 353-358.
Shen et al., Modern Processor Design—Fundamentals of Superscalar Processors, 2002. pp. 442-456.
Aristides Efthymiou, et al., Adaptive Pipeline Depth Control for Processor Power-Management; 2002, pp. 454-457, 2002 IEEE International Conference on Computer Design: VLSI in Computers and Processors.
Hajime Shimada, et al, Pipeline Stage Unification for Low-Power Consumption; COOL Chips V, Apr. 18-20, 2002, pp. 194-200, Presentation at Fifth International Symposium on Low-Power and High-Speed Chips, in Tokyo, Japan.
R.I. Bahar, et al., Power and Energy Reduction Via Pipeline Balancing; Jun. 30-Jul. 4, 2001, pp. 218-229, Proceedings 28th Annual International Symposium on Computer Architecture.
E. Schuchman, et al., Rescue: A Microarchitecture for Testability and Detect Tolerance; Jun. 4-8, 2005, pp. 160-171, Proceedings, 32nd International Symposium on Computer Architecture.

* cited by examiner

APPARATUS AND METHOD FOR ACTIVATING AND SHUTTING DOWN ENHANCED PIPELINE STAGES AND ENHANCED MODULES BASED ON PRIORITY AND PERFORMANCE REQUIREMENTS

CROSS-REFERENCE TO RELATED APPLICATIONS

This application is a continuation application, which claims the benefit of:
(1) U.S. patent application Ser. No. 14/947,823, filed Nov. 20, 2015 and issued as U.S. Pat. No. 9,671,856, which claims the benefit of:
  (a) U.S. patent application Ser. No. 12/357,910, filed Jan. 22, 2009and issued as U.S. Pat. No. 9,563,259, which claims the benefit under 35 U.S.C. 517 119 of China Application Serial Number 200810003557.5, filed Jan. 25, 2008; and
  (b) U.S. patent application Ser. No. 13/457,011, filed Apr. 26, 2012 and issued as Patent No. 9,348,406 on May 24, 2016, which claims the benefit of U.S. patent application Ser. No. 12/357,910, filed Jan. 22, 2009 and issued as U.S. Pat. No. 9,563,259, which claims the benefit under 35 U.S.C. § 119 of China Application Serial Number 200810003557.5, filed Jan. 25, 2008; and
(2) U.S. patent application Ser. No. 12/357,910, filed Jan. 22, 2009, which claims the benefit under 35U.S.C. 517 119 of China Application Serial Number 200810003557.5, filed Jan. 25, 2008;
U.S. patent application Ser. Nos. 14/947,823, 12/357,910 and 13/457,011 and China Application Serial Number 200810003557.5 are herein incorporated by reference in their entirety.

FIELD OF THE INVENTION

The present invention generally relates to the field of processor power consumption and, in particular, to a method of reducing the power consumption in a pipeline technique-based processor.

BACKGROUND OF THE INVENTION

Power/energy and environment problems are gaining more and more concern of people. In IT infrastructure, there are thousands of computing devices running in the world every day, such as mobile phones, desktops, servers etc. However, relevant statistics show that the resource utilization efficiency of these computing devices is quite low. For example, the utilization efficiency of x86 server represented by Intel stands at 10% to 15% only.

People have been fighting against power consumption issues from different levels, e.g., to design low power consumption chipsets with advanced technologies or to adjust the operating voltage and frequency according to workloads.

All modern processors, i.e. CPUs, are fabricated with CMOS technologies. CMOS power consumption is divided into dynamic power consumption and static power consumption. Static power consumption means standby power consumption even when devices do not implement any action, which is mainly caused by leakage currents of transistors. Dynamic power consumption is mainly the power consumption for turnover actions when transistors are operating. Dynamic power consumption is the main source of CPU power consumption, so the solution of dynamic power consumption in a CPU is the key to the reduction of the total CPU power consumption. As is well known in the art, dynamic power consumption is illustrated by formula (1):

$$P_{DYNAMIC} = C_L \cdot N_{SW} \cdot V^2_{DD} \cdot f \tag{1}$$

in which $P_{DYNAMIC}$ is dynamic power consumption, $C_L$ is the total equivalent capacitance, $N_{SW}$ is the ratio of switching action to system clock, $V_{DD}$ is the supply power, and f is operating frequency. As is clear from formula (1), dynamic power consumption is proportional to the total equivalent capacitance. If the total equivalent capacitance can be reduced, dynamic consumption can be reduced linearly, and the total CPU power consumption can be decreased accordingly. In chip design, the capacitance is equivalent to the transistors to carry out operations. Therefore, to reduce the transistors carrying out operations in chips is equal to reduce the equivalent capacitance, and thus power consumption can be decreased.

Modern integrated processors, such as microprocessors and digital signal processors, are commonly designed using a complex pipelined architecture. In a CPU, pipeline and data/instruction feeding logics are the most active components which occupy a fairly large part of the total CPU power consumption. According to statistics, pipeline occupies about ⅓ of the total power consumption. Therefore, to decrease the power consumption of pipeline can reduce the power consumption of processors effectively.

The concept of pipeline references assembly pipeline in industrial production. Specifically, in a CPU, several (e.g. six) circuit units with different functions form an instruction processing pipeline, and then an instruction is divided into six steps implemented by these circuit units. Through the instruction superimposing method, an instruction can be completed in one CPU clock cycle, so the CPU computing speed is enhanced. Typically, these circuit units with different functions on a pipeline are called processing stage (or called "stage" optionally). Each stage executes a specific function and transfers the processing result to the next stage.

In an early pipelined structure, there are only pipeline stages that fulfill basic functions. The most classical one is a five-stage pipelined structure whose detailed functions comprise: instruction fetch (IF), instruction decoding (ID), execution (EX), memory access (MEM) and write back (WB). Among them, instruction fetch IF is for fetching an instruction from PCs and random memories (RAM) and outputting the instruction to the next stage; instruction decoding ID is for decoding the fetched instruction; execution EX usually includes an arithmetic logic unit (ALU) for executing the decoded instruction; memory access MEM is for accessing a memory to acquire operation data; and write back WB is for writing the result of execution to a register or memory for later use. With these pipeline stages fulfilling basic functions, CPU can execute computing tasks. Let's define this design methodology of ARM-like CPU as "design for efficiency (DFE)."

With the development of the production process for integrated circuits and the increasing reduction of the dimension of transistors, more transistors can be integrated on a single chip, and the requirement on the computing performance imposed by people gets more and more stringent at the same time. Therefore, some functions for improving the computing performance have been added to CPU pipeline design, and the number of stages of a pipeline also increases gradually, such as 13 stages, 19 stages, or even 30-odd stages. The five-stage pipelined structure outlined above is elaborated, and the five basic functions are distributed over more stages, and the function fulfilled in each stage gets increasingly complicated. These additional functions for improving the computing performance, for example, may include: superscalar, hazards detection, branch prediction, register renaming, issue selection, reorder buffer, data forwarding, speculative execution, dynamic scheduling etc. Among them, superscalar simultaneously executes multiple processes by building in a plurality of pipelines. In other words, superscalar implements multiple tasks using more transistors, i.e. trades space for time. Hazards detection, also called out-of-order execution, means dispatching, not in an order specified by the program, a plurality of instructions to respective pipeline stages to be processed, but first making analysis and judgment according to the operating state of each pipeline stage and the fact whether an instruction to be processed can be executed in advance, and then according to the result of judgment, sending the instruction which can be executed in advance to corresponding pipeline stages for execution, i.e. making full use of idle pipeline stages to cause CPU internal circuits to operate at a full load and thereby improving the speed of CPU operating programs. Branch prediction involves CPU dynamic execution techniques, in which instructions are executed in an original order when there is no conditional branch in the instructions and when there is a conditional branch in instructions, decision is made, according to the result of processing the instructions in pipelines, as to whether the instructions are executed in an original order. Branch prediction means it is able to predict, before the result of the previous instruction is produced, whether a branch is transferred, so corresponding instructions can be executed in advance. As a result, pipelines are prevented from idle wait, and the CPU computing speed is enhanced. Other additional functions are added for the purpose of performance enhancement. Let's define this design methodology of Pentium-like CPU as "design for performance (DFP)".

FIG. 1a and FIG. 1b illustrate a typical pipelined architecture having 19 stages in modern processors, in which, in addition to the basic functions requisite for carrying out tasks mentioned above, there are various complex functions used for performance enhancement and some pipeline stages include multiple modules.

As is clear from the architecture design of modern processors described above, the addition of a large number additional functions, although bringing about higher performance and faster speed for the computation of processors, is implemented by more transistors, thereby occupying a larger chip area and consuming more power. For example, the mainstream PC configuration in 1995 was 486d×2-66 CPU with the power consumption of 2.5 W; at present, Pentium 4 (Presoctt) has a peak power of 255 W, an idle power of 120 W. This records an average increase of over 60 times.

Further, we have noted that there is a severe resource waste in existing computing devices: almost all CPUS of computing devices are under utilization or have an extremely low utilization efficiency. For example, assume a desktop CPU can operate at a high frequency of 3.2 GHz, whereas such a high computing power, i.e. its peak performance, is needed only during 5% of the time in a day, and a low-frequency CPU with simple pipelines can fulfill the computing task during 95% of the time. However, due to the complicated pipeline design used by the CPU, the aforesaid pipeline stages and/or modules for improving the computing performance are still invoked during 95% of the time even if there is no need for a quite high computing performance.

Therefore, the use of these pipeline stags and/or modules occupies a large amount of energy without any meaningful output, which wastes power. Furthermore, with the advancement of computer technologies, users are more concerned with which manner is the most electricity-saving, i.e. has the lowest power consumption on the premise of meeting the performance requirements.

It can be seen from the analysis provided above that since these computing devices operate at a low load at most time, there is a large energy saving space in these computing devices. If the power consumption of computing devices can be reduced without impairing the performance or minimizing the performance loss, then energy and environment problems will be alleviated greatly.

In IEEE 2001, Proceeding of the $28^{th}$ Annual International Symposium on Computer Architecture (ISCA'01), an essay entitled "Power and Energy Reduction Via Pipeline Balancing" (hereinafter referred to as reference document 1) proposes a pipeline balancing (PLB) technique. This technique adjusts the width of pipelines based on the amount of parallelism within a program and achieves the purpose of reducing the power consumption by adopting relatively wide pipelines when the amount of parallelism is relatively high and adopting relatively narrow pipelines when the amount of parallelism is relatively low. Its essence is superscalar technique. This technique reduces power consumption in a certain extent, whereas it has limitations: it decides the width of pipelines based on the amount of parallelism within a program only, regards a pipeline as a unit and thus is a relatively coarse power consumption management technique. Therefore, this technique is not applicable in at least two cases. One case is, for example, when the amount of parallelism within a program is very high but the requirement on performance is not very high. For example, during browsing a web page, a browser will naturally browse from the top down according to his reading habit. If the content of the lower portion is displayed slightly later than the content of the upper portion, it does not affect the user's browsing experience and can be accepted by the user. According to the PLB technique, however, the adoption of relatively wide pipelines will present all content on the web page to the user at the same time. Although the performance is very high, the user's experience makes no difference. Additionally, more power will be consumed. The other case is, for example, during processing programs that cannot be processed in parallel, such as audio play and the like, only relatively narrow pipelines can be adopted according to the PLB technique. Although power consumption can be saved, performance cannot be improved.

The prior art outlined above reduces CPU power consumption in a certain extent from an aspect, whereas its application is rather limited and it does not achieve the optimal balance between performance and power consumption. Therefore, there is a need for a mechanism which can effectively reduce power consumption and meet certain performance requirements and is applied to CPUs in various environments.

SUMMARY OF THE INVENTION

To overcome the deficiencies in the prior art, the present invention provides an apparatus and method of effectively reducing power consumption while meeting certain performance requirements in a pipeline technique-based processor.

According to an aspect of the present invention, there is provided a method of processing instructions in a pipeline-based central processing unit, wherein the pipeline is partitioned into base pipeline stages and enhanced pipeline stages according to functions, the base pipeline stages being activated all the while, and the enhanced pipeline stages being activated or shut down according to requirements for performance of a workload.

According to another aspect of the present invention, there is provided a pipeline-based processor, wherein the pipeline is partitioned into base pipeline stages and enhanced pipeline stages according to functions, the base pipeline stages being activated all the while; wherein the processor further comprises a controller for activating or shutting down the enhanced pipeline stages according to requirements for performance of a workload.

According to a further aspect of the present invention, there is provided a method of processing instructions in a pipeline-based central processing unit, wherein the pipeline is partitioned into base pipeline stages and enhanced pipeline stages according to functions, each pipeline stage being partitioned into a base module and at least one enhanced module, the base module being activated all the while, and the enhanced module being activated or shut down according to requirements for performance of a workload.

According to a still further aspect of the present invention, there is provided a pipeline-based processor, wherein the pipeline is partitioned into base pipeline stages and enhanced pipeline stages according to functions, each pipeline stage comprising a base module and at least one enhanced module, the base module being activated all the while, and the enhanced module being activated or shut down according to requirements for performance of a workload.

The method provided in the present invention which may apply to CPUs under various environments can effectively reduce power consumption and improve utilization efficiency of resources. Further, the method of the present invention is highly adaptive, which can automatically switch between DFE-type CPUs and DFP-type CPUs according to actual requirements for performance. As a result, not only demands for peak performance of computing devices are met, but power consumption is reduced effectively without increasing additional burden at most of time of a low load.

Additionally, the method of the present invention does not interfere with other power consumption management methods, i.e. can be used with other existing CPU power consumption management methods at the same time. For example, the method of the present invention may be compatible with the PLB technique outlined in reference document 1. That is to say, while widths of pipelines are taken into consideration, the method of the present invention applies in each pipeline by adding modules of pipeline stages based on the order of priority levels and according to actual requirements for performance.

BRIEF DESCRIPTION ON THE DRAWINGS

The features, advantages, and other aspects of the present invention will become more apparent from the following detailed description, when taken in conjunction with the accompanying drawings in which.

It is to be understood that like reference numerals denote the same parts throughout the figures.

DESCRIPTION OF THE PREFERRED EMBODIMENTS

Figure 1A:
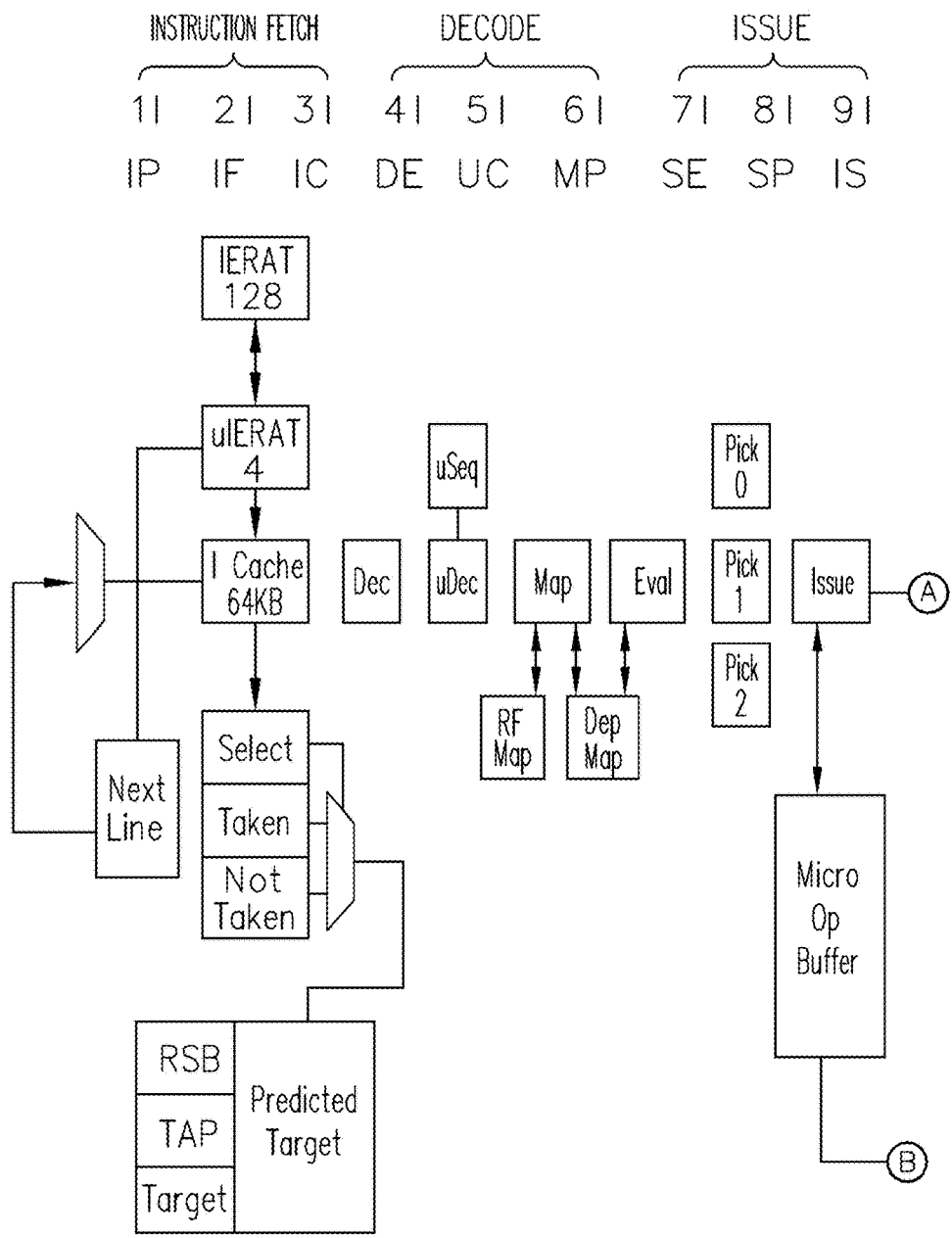
FIG. 1a and FIG. 1b illustrate a typical 19-stage pipelined architecture in modern CPUs in the prior art.
Figure 1B:
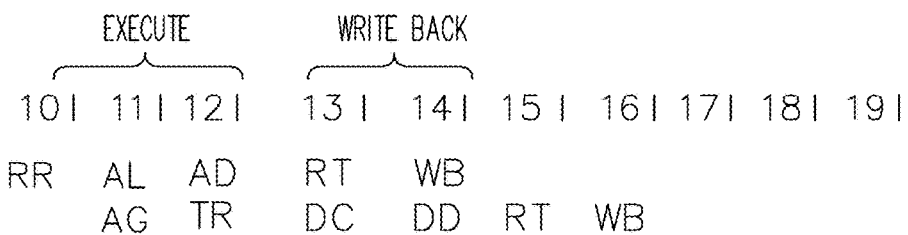
Figure 1B:
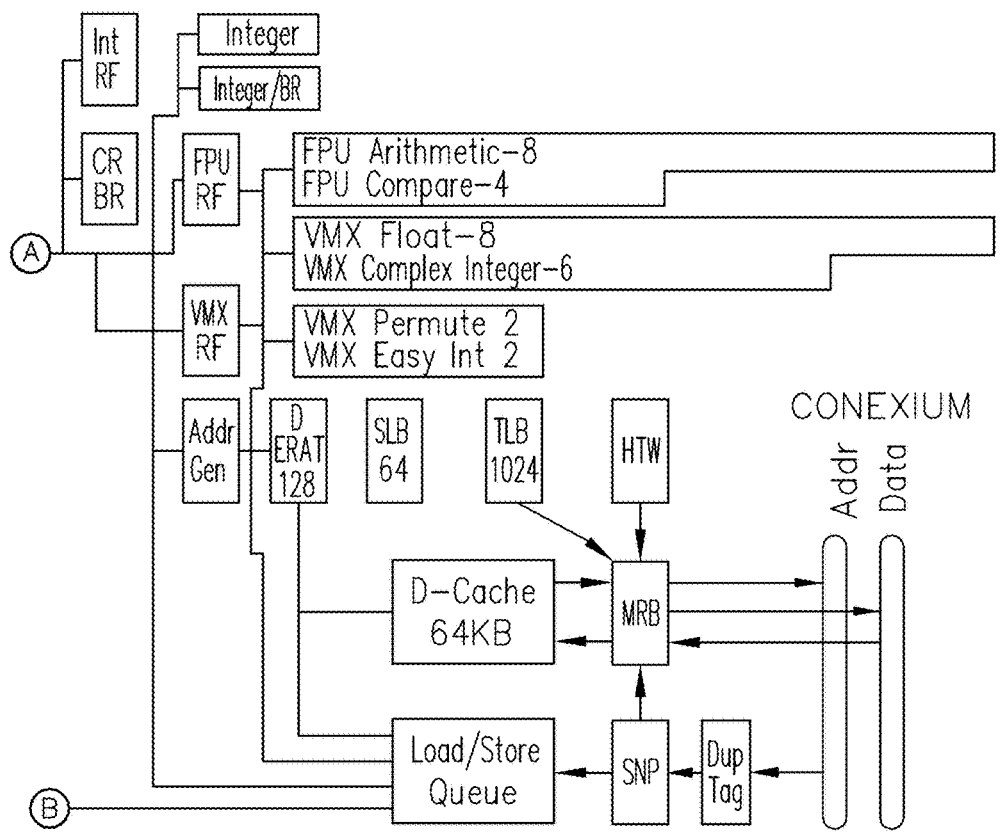

To facilitate a comprehensive understanding of the present invention, many particular details are illustrated by way of example in the following detailed description. However, those skilled in the art will recognize that the present invention may be implemented without these details. Additionally, to explain the present invention in a clearer way, a general description but not a detailed description is given to well known methods, processes, elements and circuits in some examples. A more detailed explanation and illustration will be given to the present invention with reference to the accompanying drawings. It is to be understood that the accompanying drawings and embodiments of the present invention are for purposes of illustration, and are not intended to be limited to the protection scope of the present invention.

The basic principles of the present invention are to provide a modular design method and a corresponding processor. According to different performance needs, there are provided functional modules and/or pipeline stages meeting these performance needs, and other modules and/or pipeline stages that do not need to be provided are closed, thereby effectively reducing power consumption.

As described previously, the pipelined architecture of modern CPUs comprises a plurality of pipeline stages each carrying out a certain function and transferring the result to the next pipeline stage in the pipelines. According to the function carried out by each pipeline stage, the present invention divides pipeline stages into base pipeline stages and enhanced pipeline stages.

Base pipeline stages are pipeline stages adopted corresponding to functions requisite for processing programs or executing tasks by processors, e.g. the functions carried out in the early pipelined structure described previously. Generally speaking, base pipeline stages comprise: an instruction fetch (IF) pipeline stage, an instruction decoding (ID) pipeline stage, an execution (EX) pipeline stage, a memory access (MEM) pipeline stage and a write back (WB) pipeline stage.

Enhanced pipeline stages are pipeline stages adopted for enhancing the performance of processors, e.g. the additional functions added to modern CPU pipelines described previously, and may comprise, for example, a superscalar pipeline stage, a hazards detection pipeline stage, a branch prediction pipeline stage, a register renaming pipeline stage, an issue selection pipeline stage, a reorder buffer pipeline stage, a data forwarding pipeline stage, a speculative execution pipeline stage, a dynamic scheduling pipeline stage, etc. Although these additional pipeline stages are used for enhancing the performance of processors, they are added based on different consideration. Therefore, the respective amounts of enhancement of overall CPU performance are varying, and the respective consumed powers are also different. Further, even for one identical branch prediction pipeline stage, it produces different prediction accuracy when adopting different algorithms for branch prediction, thereby different amounts of enhancement of overall CPU performance. Based on this situation, these enhanced pipeline stages are assigned with certain priority levels according to the respective ratios of contribution, which these enhanced pipeline stages make to overall CPU performance, to power consumed during making the contribution. For example, priority levels may be assigned from high to low according to the ranking of ratios of performance to power consumption (referred to as performance-to-power consumption ratio for short). Specifically, during dividing respective pipeline stages, these pipeline stages may be marked as base pipeline stage, enhanced pipeline stage 1 and enhanced pipeline stage 2 . . . , wherein the number represents the priority level of a pipeline stage.

Further, the present invention divides the inside of each pipeline stage into modules. Similar to the concept of dividing pipeline stages outlined above, each pipeline stage may be partitioned into a plurality of modules, including a base module and enhanced modules. The base module is a module adopted by the pipeline stage, corresponding to the function requisite for processing programs or executing tasks by processors. For a base pipeline stage, the base module is a module that executes the smallest function of the base pipeline stage. For example, for an instruction fetch pipeline stage, the base module is the smallest function which the instruction fetch pipeline stage executes (for example, fetch only one instruction each time). For an enhanced pipeline stage, the base module is a module that enables data to pass through the enhanced pipeline stage without being changed. For example, for a branch prediction pipeline stage, the base module enables data to pass without being changed. An enhanced module is a module adopted by the pipeline stage for enhancing CPU performance. For a base pipeline stage, an enhanced module is a module that enhances functions of the base pipeline stage. For example, for an instruction fetch pipeline stage, an enhanced module is a module that enhances the instruction fetch function (for example, fetch another one or three instructions each time so that the instruction fetch pipeline stage can fetch two or four instruction each time). For an enhanced pipeline stage, an enhanced module is a module that enables the enhanced pipelines stage to execute its functions or execute its functions more effectively. For example, for a branch prediction pipeline stage, an enhanced module enables the branch prediction pipeline stage to execute or more effectively execute the branch prediction function. Likewise, these enhanced modules are assigned with certain priority levels according to the respective ratios of contribution, which these enhanced modules make to system performance, to power consumed during making the contribution, i.e. performance-to-power consumption ratio. For example, priority levels may be assigned from high to low according to the ranking of ratios of performance to power consumption. Specifically, during dividing a pipeline stage into modules, these modules may be marked as base module, enhanced module 1, enhanced module 2 . . . , wherein the number represents the priority level of an enhanced module.

Figure 2A:
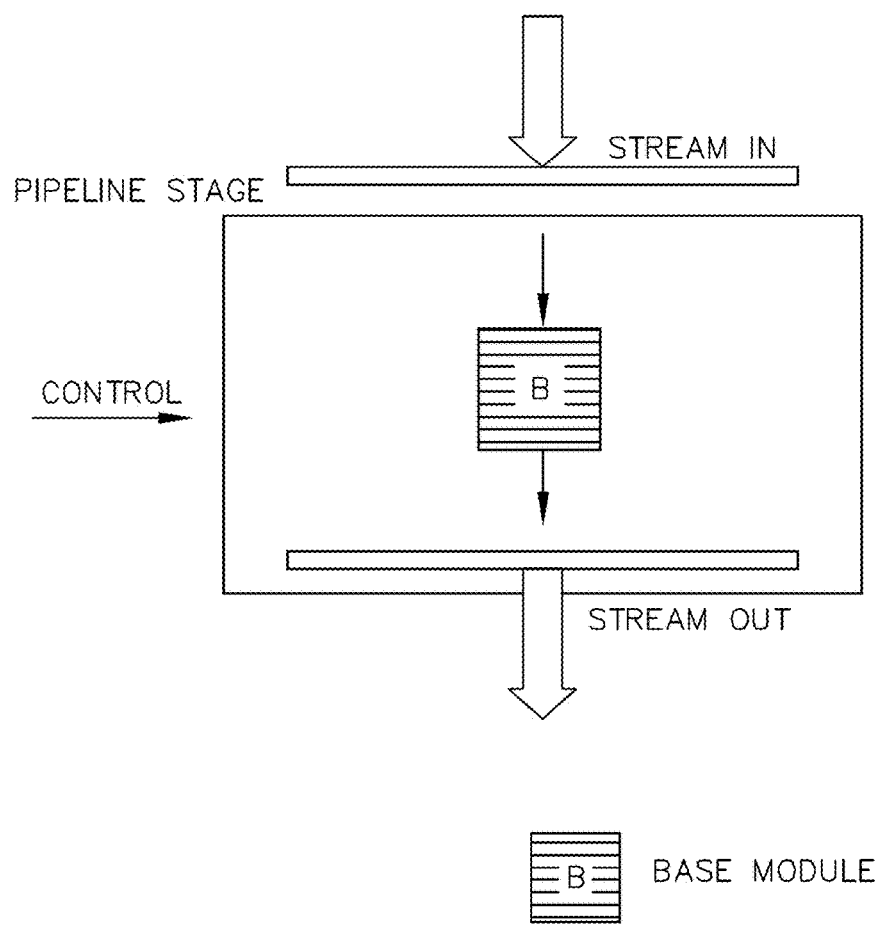
FIG. 2a illustrates a schematic view of the working condition of a certain pipeline stage at a low load according to an embodiment of the present invention.
Figure 2B:
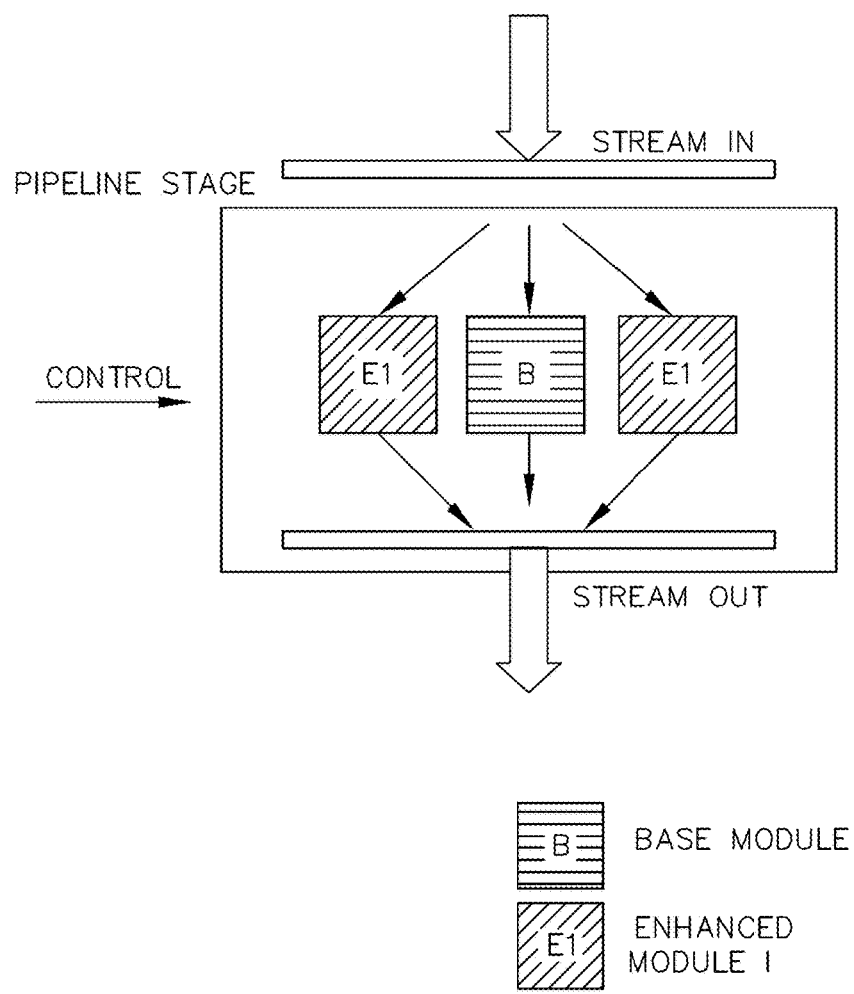
FIG. 2b illustrates a schematic view of the working condition of a certain pipeline stage at a medium load according to an embodiment of the present invention.
Figure 2C:
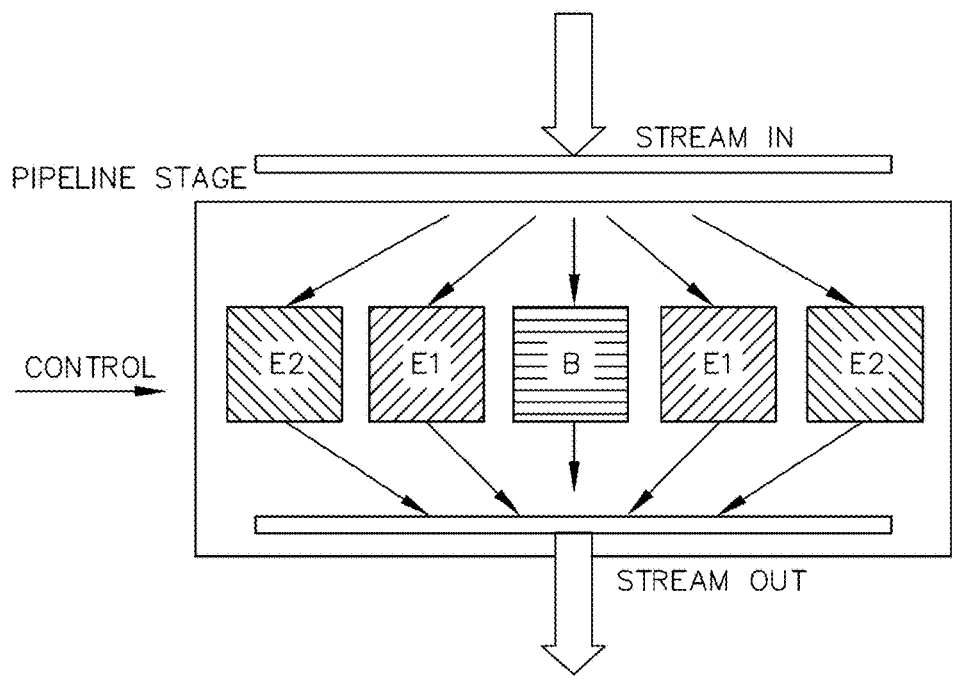
FIG. 2c illustrates a schematic view of the working condition of a certain pipeline stage at a high load according to an embodiment of the present invention.
Figure 2C:
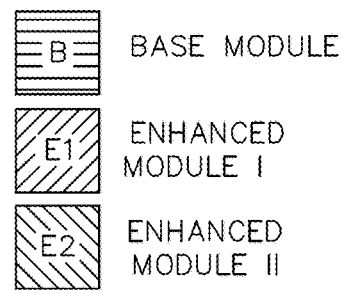

FIGS. 2a-2c illustrates the principles of the power consumption management method of the present invention. For the purpose of briefness, only one pipeline stage of a pipeline is illustrated in FIGS. 2a-2c, which includes signal stream in, signal stream out and control signal. Those skilled in the art will recognize that this power consumption management method also applies to other pipeline stages in the pipeline.

Referring to FIG. 2a, there is illustrated a schematic view of the working condition of a certain pipeline stage at a low load according to an embodiment of the present invention. Due to a relatively low workload, the system judges, according to the workload, that a base module can meet the required performance requirement. Therefore, only base module B is activated in the pipeline, and other modules are shut down, i.e. other modules do not consume power. By working in the manner of low load and low power consumption, utilization efficiency of energy can be improved greatly on the premise of meeting the required performance.

Referring to FIG. 2b, there is illustrated a schematic view of the working condition of the pipeline stage in FIG. 2a at a medium load according to an embodiment of the present invention. Compared with FIG. 2a, since the workload increases in FIG. 2b, two enhanced modules E1 that have the highest priority level are activated in the pipeline stage. Although two more modules E1 are added than the pipeline stage in FIG. 2a, i.e. two more modules consume power, since these two modules are added according to the need of performance of a program executed by the user, they are put into full use. In other words, power consumed by these two enhanced modules E1 boosts performance which is performance required by the user. Therefore, utilization efficiency of energy is also very high in this operation mode. Further, since the addition of enhanced modules is not arbitrary but is based on priority levels, power consumption can be reduced at the maximum on the premise of meeting requirements for the needed performance. Specifically, where performance needs to be improved by 50%, preferably, enhanced modules that only increase 10% of transistors (which means increasing 10% of power consumption) are first activated, other than enhanced modules that increase 60% of transistors (which means increasing 60% of power consumption) being activated.

Referring to FIG. 2c, there is illustrated a schematic view of the working condition of the pipeline stage in FIG. 2a at a high load according to an embodiment of the present invention. Since the workload increases in FIG. 2c than FIG. 2b, two more enhanced modules E2 that have the second highest priority level are activated in the pipeline stage. Similar to FIG. 2b, although several more modules consume power, since these modules E2 are added according to the need of performance of a program executed by the user, they are put into full use. In other words, power consumption can be reduced at the maximum on the premise of meeting requirements for performance needed by the user. Therefore, the usage of power consumption which is high is meaningful outputs. That is to say, utilization efficiency of energy is very high.

Additionally, judging from statistics about practical operation of computing devices, since computing devices operate at a low load at most time (about 95% of time), only the base module is put to operation when the system is just initiated, and then adjustment is made dynamically with the change in the workload. For example, some enhanced modules used for improving performance are activated when the workload increases, and some enhanced modules are shut down when the workload is reduced. The whole control is implemented automatically by the system, which is hardly noticed by users because performance they need is satisfied.

Description has been given above to an illustrative embodiment of dynamically activating or shutting down enhance modules in a certain pipeline stage according to the change in the workload. However, those skilled in the art will recognize that in the above-described embodiment the base module can be replaced by a base pipeline stage and enhanced modules can be replaced by enhanced pipeline stages. As a result, enhanced pipeline stages are activated or shut down in a certain pipeline according to the performance requirement of the workload. To shut down an enhanced pipeline stage means that functions of an enhanced pipeline stage are not activated. For example, this enhanced pipeline stage can be bypassed, or data directly passes through this enhanced pipeline stage without being changed.

Figure 3:
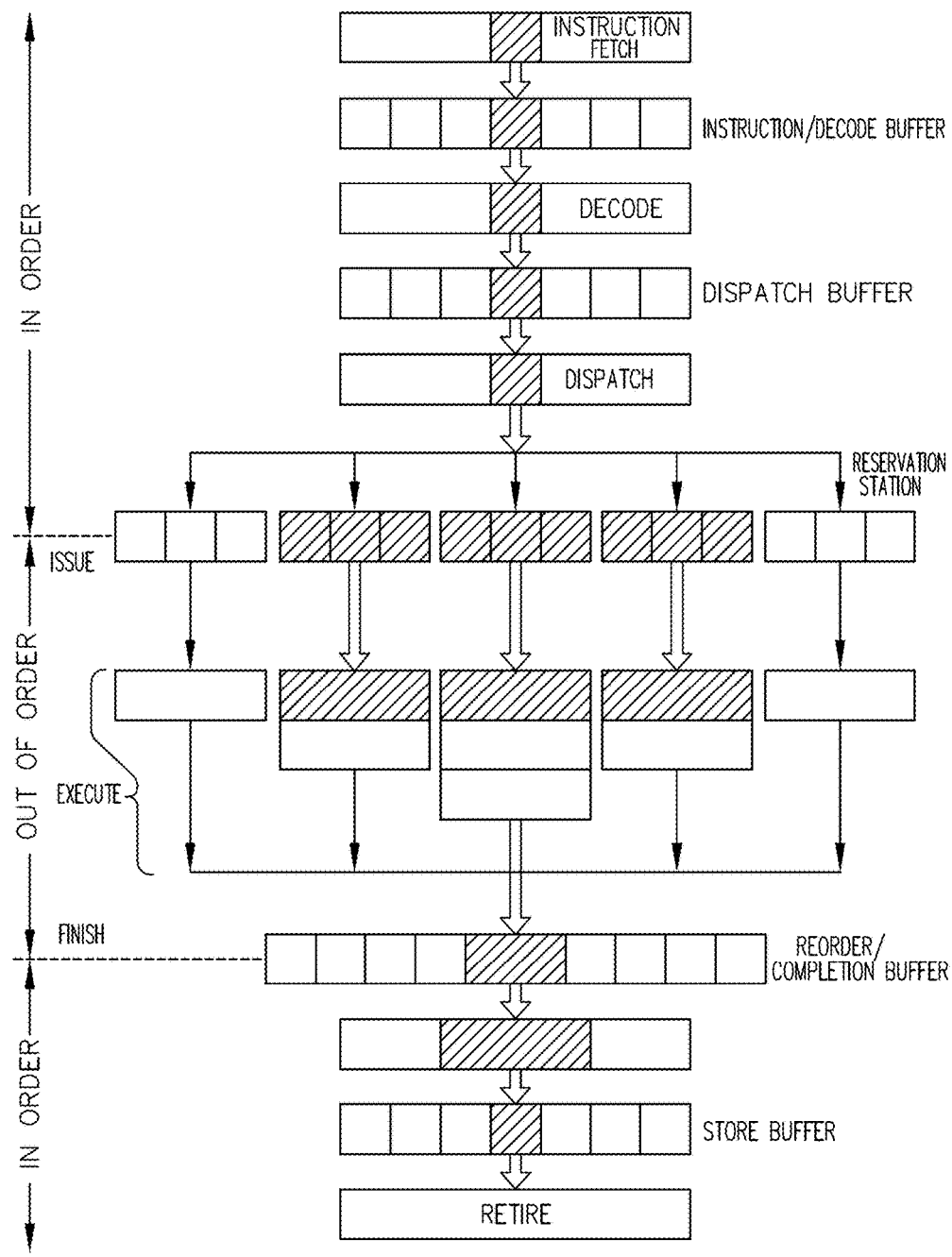
FIG. 3 illustrates an architectural view of a pipeline from the perspective of the whole pipeline according to an embodiment of the present invention.

Referring to FIG. 3, there is described a pipelined architecture according to an embodiment of the present invention from the perspective of the entire pipeline. As is clear from FIG. 3, at a certain workload and/or performance requirements, the pipelined architecture implemented by using the method of the present invention includes 13 pipeline stages each having one or more modules for carrying out certain functions. In this figure, modules in a dark color represent modules that are activated according to the need of the workload and/or performance requirement, and other modules represent modules that do not need to be activated according to the need of the workload and/or performance requirement, i.e. modules that are shut down. In addition to the base module requisite for the execution of computing tasks, some enhanced modules are activated according to the amount of the actual workload and/or performance requirement. For example, as is clear from several pipeline stages in the middle of FIG. 3, the stage Issue activates nine modules, and the stage Execute activates three modules. Referring to the foregoing description of a single pipeline stage in FIGS. 2a-2c, corresponding modules can be activated or shut down in each pipeline stage of FIG. 3 according to the workload and/or performance requirement based on priority levels. In FIG. 3, the five pipeline stages at the upper portion are executed in order, and the four pipeline stages at the middle portion can be executed out of order, and the four pipeline stages at the lower portion are also executed in order.

Figure 4:
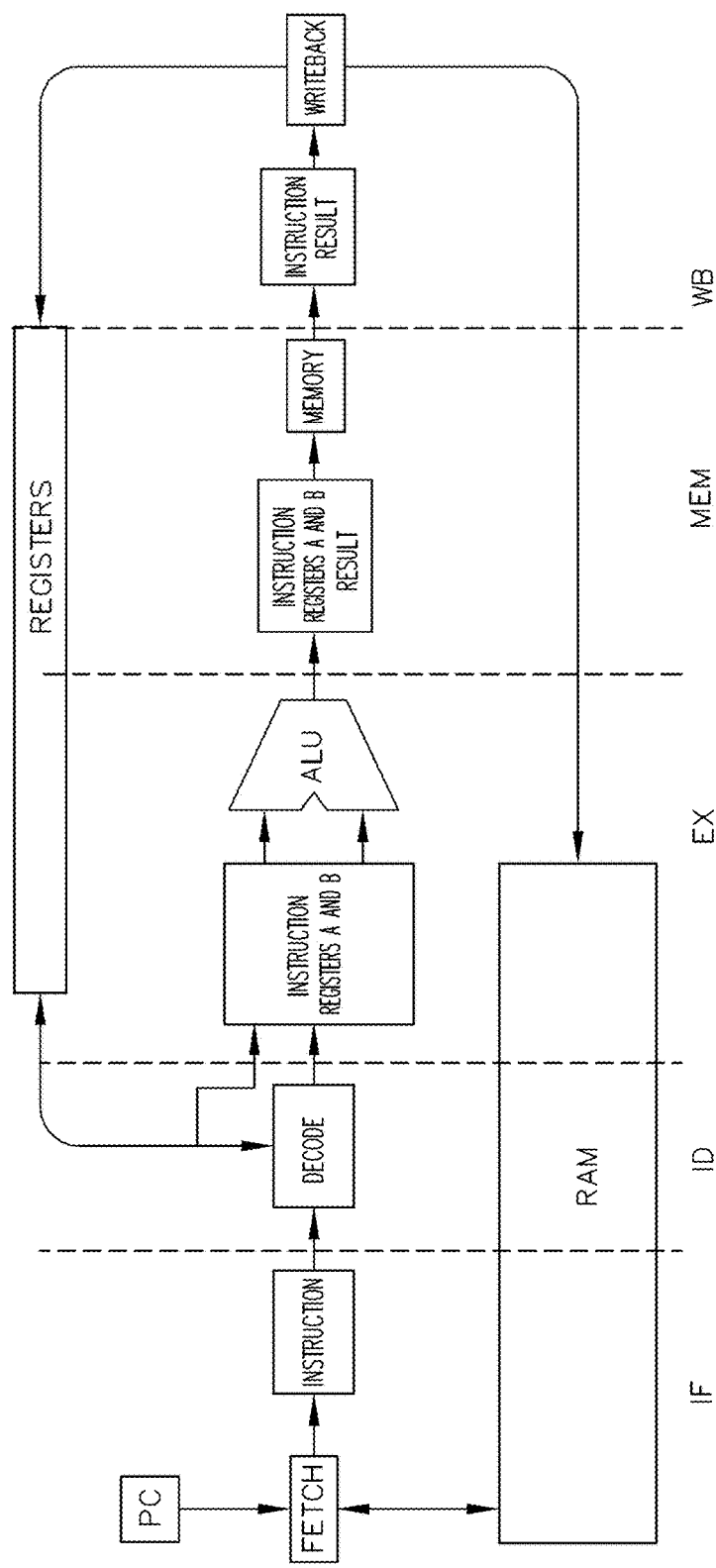
FIG. 4 illustrates an architectural view of a simplified pipeline in a situation according to an embodiment of the present invention.

For a distinct comparison, FIG. 4 illustrates a logic architectural view of a simplified pipeline, i.e. a pipelined architecture that only uses base pipeline stages, after the adoption of the power consumption management method of the present invention at a low load, i.e. during most of running time of computing devices. As is clear from FIG. 4, like the early pipelined architecture, the simplified pipeline only keeps functions of the IF pipeline stage, the ID pipeline stage, the EX pipeline stage, the MEM pipeline stage and the WB pipeline stage. Nevertheless, in the present invention these base pipeline stages are activated or base modules in each pipeline stages are activated to logically form these base pipeline stages where a low load/performance is required, and the pipeline can be flexibly adjusted where high performance is required. Therefore, the present invention can meet requirements for different loads/performance without wasting power consumption.

Figure 5:
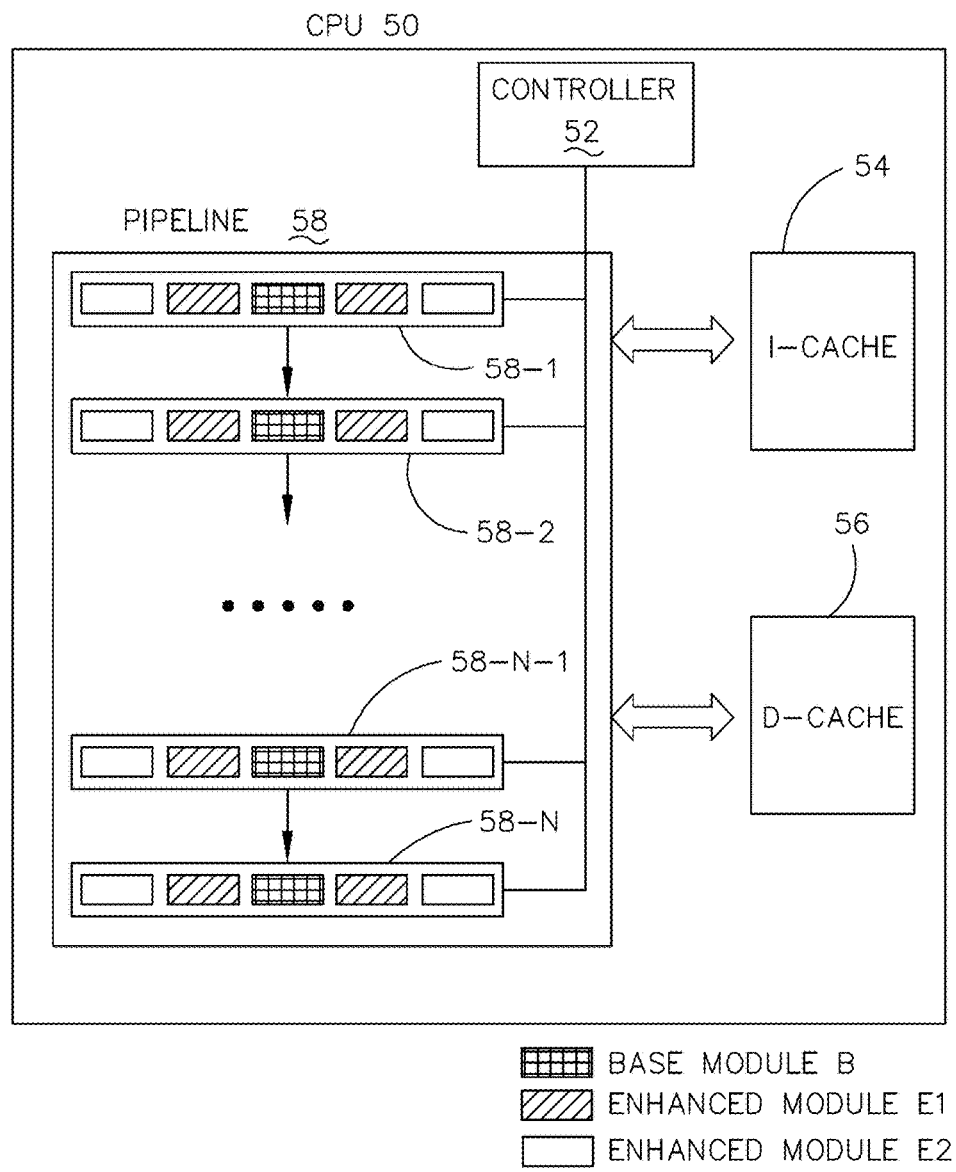
FIG. 5 illustrates a system diagram of a processor according to an embodiment of the present invention.

Referring to FIG. 5, there is illustrated a view of a processor system according to an embodiment of the present invention. In this figure, only components related to the teaching of the present invention are illustrated. However, those skilled in the art will recognize that there are other relevant components in the processor system, such as various registers, a bus unit etc. The present invention is not limited thereto, so other relevant components are omitted in FIG. 5 in order not to blur embodiments of the present invention.

The processor system of FIG. 5 illustrates a CPU 50 that comprises a controller 52, an instruction cache 54 (I cache), a data cache 56 (D cache) and a pipelined architecture 58.

Controller 52 is used for controlling the workflow of the pipeline according to an embodiment of the present invention, such as controlling particular modules and/or pipeline stages to be activated or shut down. Instruction cache 54 is used for providing uniform instruction streams for the pipeline of CPU, such as providing instructions for the IF pipeline stage in the pipeline. Data cache 56 is used for at least providing operation data requisite for the computing process of the pipeline and caching processing results. Pipelined architecture 58 is used for processing instructions according to an embodiment of the present invention. Specifically, several pipeline stages are shown in pipelined architecture 58, which are marked as 58-1, 58-2, . . . , 58-N-1, 58-N. Each pipeline stage includes one or more processing modules that are partitioned into base modules B-module and enhanced modules E-module according to the partition method outlined above. Enhanced modules are further assigned with priority levels according to respective performance-to-power consumption ratios. That is, modules with high performance-to-power consumption ratios have high priority levels, and modules with low performance-to-power consumption ratios have low priority levels. For purposes of illustration only, FIG. 5 illustrates enhanced modules with two priority levels, among which enhanced modules with a higher priority level are marked as E1 and enhanced modules with a lower priority level are marked as E2. However, those skilled in the art will recognize that although only two priority levels are illustrated in FIG. 5, more priority levels can be set according to the actual situation. Additionally, those skilled in the art will recognize that modules with each pipeline stage are basically the same as one another in FIG. 5 for purposes of illustration, whereas each pipeline stage may consist of different modules in the actual situation.

Further, controller 52 in CPU 50 may further include memory means (not shown) for storing information related to control, such as storing the priority level of each pipeline stage in the pipelined architecture, the priority level of each module in each pipeline stage and/or the association between workloads and each pipeline stage and/or module. The information related to control may be stored in the memory means in the form of a lookup table, database, algorithm or any data structure capable of associating workloads with respective pipeline stages and modules of the pipeline. During performing the control operation, the controller accesses the association stored in the memory means and judges which pipelines and/or modules need to be activated according to the current workload, in order to further control involved pipeline stages and/or modules to be activated and shut down.

Figure 6:
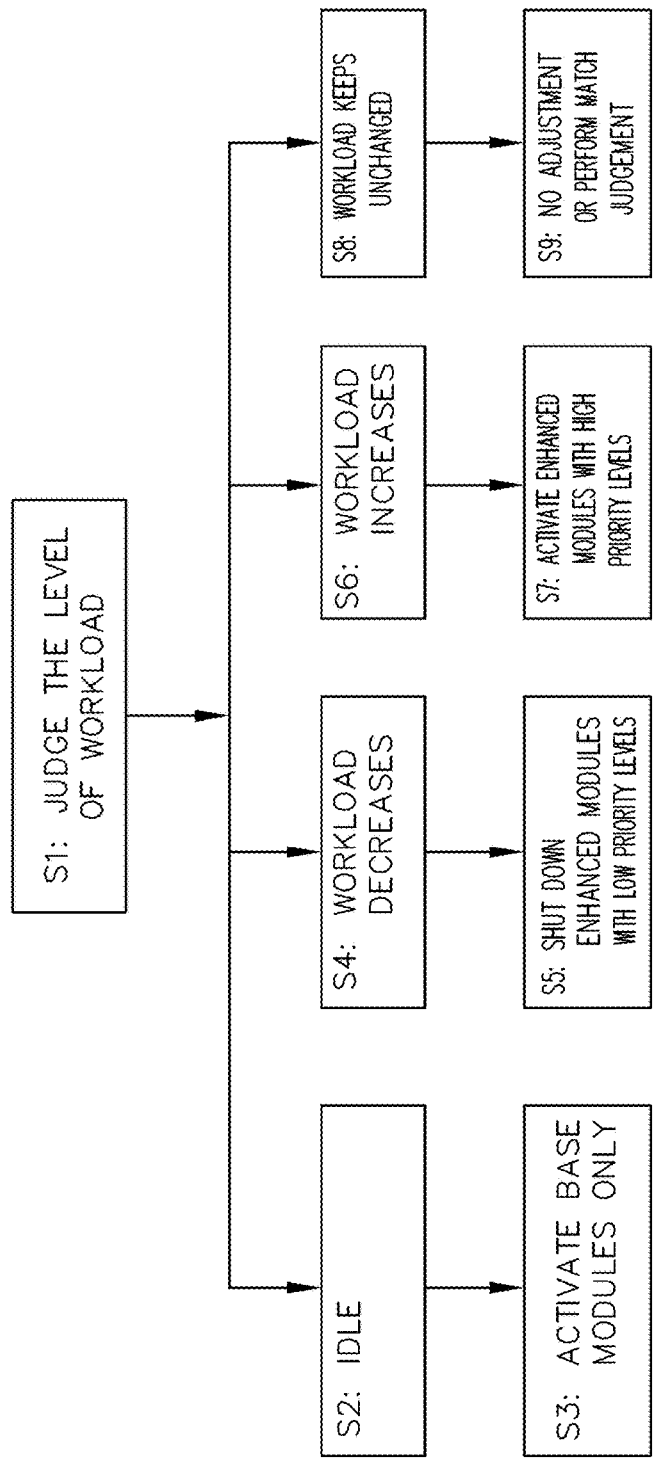
FIG. 6 illustrates a flowchart of running programs on a processor according to the present invention.

Referring to FIG. 6 there is illustrated a flow of an illustrative method for processing a particular program (or task) according to an embodiment of the present invention. Those skilled in the art will recognize that this flow is only for purposes of illustration and adaptive amendments may be made for other different processes.

In step S1 of FIG. 6, the operating system OS may judge the full-load degree of the current workload. This judgment step may be initiated periodically or triggered by events. For example, this judgment step is initiated when the program being executed changes. Based on judgment results, there may be the following operations:

One situation is that the system has no task that needs to be executed, i.e. the system is idle, and then the flow goes to step S2. At this point, all enhanced modules and/or enhanced pipeline stages can be shut down and only base modules and/or base pipeline stages are kept in step S3, in order to support the needed function with minimum power consumption.

A second situation is that the system's workload decreases, and then the flow goes to step S4. Since the system's workload decreases, the task to be executed can be completed with not so many pipeline stages and/or modules. Then, the flow goes to step S5 in which the number of enhanced pipeline stages and/or enhanced modules that were intended to be activated is reduced. For example, some enhanced modules and/or pipeline stages are shut down. The controller can judge which enhanced pipeline stages and/or enhanced modules need to be shut down, according to the association stored in the memory means and based on the decrease in the workload or the level which the current workload belongs to. Since enhanced pipeline stages and/or enhanced modules have been assigned with priority levels according to respective performance-to-power consumption ratios, preferably, enhanced pipeline stages and/or enhanced modules with lower priority levels are first shut down. In this manner, when the workload decreases, not only requirements for the needed performance are met, but also power consumption is reduced at the maximum and energy provided is put into full use. When the workload decreases greatly, more enhanced pipeline stages and/or enhanced modules might be shut down in the order of priority levels from the lowest, the second lowest . . . , until only base pipeline stages and/or modules are kept.

A third situation is that the system's workload increases, and then the flow goes to step S6. The processing in this situation is similar to the processing of a second situation, except that there is a need for more enhanced pipeline stages and/or enhanced modules. That is to say, the flow goes to step S7. Specifically, the controller judges which enhanced pipeline stages and/or enhanced modules need to be activated, according to the association stored in the memory means and based on the increase in the workload or the level which the current workload belongs to. Since enhanced pipeline stages and/or enhanced modules have been assigned with priority levels according to respective performance-to-power consumption ratios, preferably, enhanced pipeline stages and/or enhanced modules with higher priority levels are first activated. In this manner, when the workload increases, not only requirements for the needed performance are met, but also power consumption is reduced at the maximum and energy provided is put into full use. When the workload increases greatly, more enhanced pipeline stages and/or enhanced modules might be activated in the order of priority levels from the highest, the second highest . . . , until all enhanced pipeline stages and/or enhanced modules are activated.

A fourth situation is that the system's workload does not change, and then the flow goes to step S8. Generally speaking, no adjustment needs to be made when the workload does not change. However, when the system is just power on, there will be a default pipeline configuration for processing. If the default pipeline configuration does not match the current workload, even if the workload does not change, the controller can still judge the level which the current workload belongs to, and then adjusts the pipelined architecture accordingly in order to match the current workload, that is, to reduce power consumption at the maximum on the premise of meeting current requirements for performance. The adjustment may be to add or reduce some enhanced pipeline stages and/or enhanced modules according to the actual situation. Therefore, the processing can be implemented in step S9.

In addition, when the system is just power on, there will be a default pipeline configuration that may vary with application environments. For example, since most of computing devices operate at a low load at most time (about 95% of time) at present, the default configuration can be set to only include base pipeline stages and/or modules. For some servers that assume important computing tasks, the default configuration can be set to include all pipeline stages and/or modules. Of course, there may be various types of configuration settings.

In the aforesaid flow, controller 52 in CPU 50 controls respective enhanced pipeline stages and enhanced modules to be activated or shut down. As is well known to those skilled in the art, to activate and/or shut down these enhanced pipeline stages and enhanced modules may be implemented in the manner of software, such as through enable signals. Additionally, to activate and/or shut down these enhanced pipeline stages and enhanced modules may be implemented in the manner of hardware, such as through a switch or multi-path selector. However, the present invention is not intended to this, and any manner capable of activating and/or shutting down enhanced pipeline stages and enhanced modules can apply to embodiments of the present invention.

Furthermore, to partition each enhanced pipeline stage and each enhanced module in embodiments of the present invention is based on priority levels that are assigned according to performance-to-power consumption ratios. This partitioning is down during the CPU design period. Although most CPUs have a similar pipelined architecture, the pipelined architecture of each kind of CPU has its own characteristics. Therefore, specific priority levels may be different from one another. For example, for identical branch prediction modules, the modules might employ different instruction prediction mechanisms in CPU pipelined architectures of different types, such as an advanced dynamic execution engine and an instruction execution trace cache, in order to improve accuracy of branch prediction and reduce instruction restoration time caused by prediction failure. Therefore, the improvement which these branch prediction modules make to overall CPU computing performance is varying, and their power consumption is also different. During the CPU design period, performance parameters of these enhanced pipeline stages and/or enhanced modules can be gotten by means of simulation, prototype test, etc. For example, different modules might take different time to obtain the same results from running the same section of a program, so their performance indices can be obtained. Power consumption of enhanced pipeline stages and/or enhanced modules is related to various factors. A most straightforward manner is to judge the amount of power consumption based on the number of used transistors or the occupied area on the chip. Of course, those skilled in the art will recognize that there may be many other manners for measuring power consumption of each enhanced pipeline stage and/or enhanced module. However, embodiments of the present invention can apply provided that performance-to-power consumption ratios of these enhanced pipeline stages and/or enhanced modules. Further, embodiments of the present invention can apply with the knowledge of the order of priority levels ranked according to performance-topower consumption ratios of these enhanced pipeline stages and/or enhanced modules and without knowing concrete performance-to-power consumption ratios.

Further, the judgment as to various workloads in the present invention can be implemented in a variety of manners by those skilled in the art. However, the present invention is not aimed at this so long as the intensity of the current workload or the variance of the workload is provided.

Those skilled in the art will recognize from the foregoing description of embodiments of the present invention that the present invention may have variances. For example, an embodiment of the present invention may only adjust the activation and shutdown of enhanced modules in pipeline stages; another embodiment of the present invention may adjust the activation and shutdown of each enhanced pipeline stage; and a further embodiment of the present invention may adjust the activation and shutdown of pipeline stages and modules in pipeline stages at the same time. All of these variances fall under the scope of the present invention.

Further, embodiments of the present invention may apply in conjunction with other existing power consumption management methods. For example, the method of the present invention may be compatible with the PLB technique outlined in reference document 1. That is to say, when there is a plurality of pipelines, not only widths of the pipelines are controlled according to the workload, but also the method of the present invention applies in each pipeline by adding enhanced pipeline stages and/or enhanced modules according to the actually needed performance.

It is to be understood from the foregoing description that modifications and alterations may be made to all embodiments of the present invention without departing from the spirit of the present invention. The description in the present specification is intended to be illustrative and not limiting. The scope of the present invention is limited by the claims as appended only.

What is claimed is:

1. A method for controlling a pipeline-based processor, the pipeline-based processor comprising at least one pipeline, the at least one pipeline at least including a particular pipeline, wherein the particular pipeline is partitioned into a plurality of pipeline stages based on one or more functions, the plurality of pipeline stages including one or more base pipeline stages and a plurality of enhanced pipeline stages, each enhanced pipeline stage configured to be either a shutdown enhanced pipeline stage or an activated enhanced pipeline stage, all functions of each shutdown enhanced pipeline stage being not activated, at least one function of each activated enhanced pipeline stage being activated, wherein at least one of the plurality of enhanced pipeline stages is configured to be activated while at least another of the plurality of enhanced pipeline stages is shut down, wherein each enhanced pipeline stage has an enhanced stage priority level of at least two different enhanced stage priority levels, at least one of the plurality of enhanced pipeline stages having a different enhanced stage priority level than at least one other of the plurality of enhanced pipeline stages, a particular pipeline stage of the plurality of pipeline stages including at least one base module and a plurality of enhanced modules, each base module of the at least one base module being a partitioned portion of the particular pipeline stage of the particular pipeline of the pipeline-based processor, each enhanced module of the plurality of enhanced modules being a partitioned portion of the particular pipeline stage of the particular pipeline of the pipeline-based processor, each of the at least one base module of the particular pipeline stage being activated while the particular pipeline stage is activated, each enhanced module of the particular pipeline stage having a particular priority level of at least two different enhanced module priority levels, at least one of the plurality of enhanced modules of the particular pipeline stage having a different priority level than at least one other of the plurality of enhanced modules, wherein at least one particular enhanced module of the plurality of enhanced modules of the particular pipeline stage is configured to be activated while at least another particular enhanced module of the plurality of enhanced modules of the particular pipeline stage is shut down, the method comprising:

determining a change in a workload;

activating or shutting down, by at least one controller circuit, one or more of the plurality of enhanced pipeline stages based on at least one corresponding enhanced stage priority level of the one or more of the plurality of enhanced pipeline stages and requirements for performance of the workload; and activating or shutting down, by the at least one controller circuit, one or more of the plurality of enhanced modules of the particular pipeline stage based on at least one corresponding enhanced module priority level of the one or more of the plurality of enhanced modules of the particular pipeline stage and the requirements for the performance of the workload.

2. The method of claim 1, wherein each enhanced module of the particular pipeline stage is determined to have one particular priority level of the at least two different enhanced module priority levels according to a performance-to-power consumption ratio of that enhanced module of the particular pipeline stage, wherein a relatively high performance-to-power consumption ratio corresponds to a relatively high priority level.

3. The method of claim 2, wherein activating or shutting down, by the at least one controller circuit, the one or more of the plurality of enhanced modules of the particular pipeline stage based on the at least one corresponding enhanced module priority level of the one or more of the plurality of enhanced modules of the particular pipeline stage and the requirements for the performance of the workload further comprises:

activating, by the at least one controller circuit, two or more of the plurality of enhanced modules of the particular pipeline stage in a high-to-low order of the at least two different enhanced module priority levels when the workload increases based on at least two corresponding enhanced module priority levels of the two or more of the plurality of enhanced modules of the particular pipeline stage and the requirements for the performance of the workload.

4. The method of claim 2, wherein activating or shutting down, by the at least one controller circuit, the one or more of the plurality of enhanced modules of the particular pipeline stage based on the at least one corresponding enhanced module priority level of the one or more of the plurality of enhanced modules of the particular pipeline stage and the requirements for the performance of the workload further comprises:

shutting down, by the at least one controller circuit, two or more of the plurality of enhanced modules of the particular pipeline stage in a low-to-high order of the at least two different enhanced module priority levels when the workload decreases based on at least two corresponding enhanced module priority levels of the two or more of the plurality of enhanced modules of the particular pipeline stage and the requirements for the performance of the workload.

5. The method of claim 2, further comprising:
accessing, by the at least one controller circuit, a memory means for storing priority level information of the plurality of enhanced modules of the particular pipeline stage.

6. The method of claim 1, wherein the particular priority level of each enhanced module of the particular pipeline stage is based upon a performance-to-power consumption ratio.

7. The method of claim 1, wherein the at least two different enhanced module priority levels include at least a highest enhanced module priority level, the highest enhanced module priority level having a relative priority higher than any other priority level of the at least two different enhanced module priority levels, wherein a particular enhanced module of the particular pipeline stage having the highest enhanced module priority level has a higher performance-to-power consumption ratio than any other enhanced module of the particular pipeline stage having a priority level other than the highest enhanced module priority level.

8. The method of claim 1, wherein the particular pipeline stage is a base pipeline stage.

9. The method of claim 1, wherein the particular pipeline stage is an enhanced pipeline stage.

10. The method of claim 1, wherein the at least two different enhanced stage priority levels include at least a highest enhanced stage priority level, the highest enhanced stage priority level having a relative enhanced stage priority higher than any other enhanced stage priority level of the at least two different enhanced stage priority levels, wherein the at least two different enhanced stage priority levels include at least a highest priority level, the highest priority level having a relative priority higher than any other priority level of the at least two different enhanced stage priority levels.

11. The method of claim 1, wherein a base module of a particular base pipeline stage executes a smallest function of the particular base pipeline stage.

12. The method of claim 1, wherein an enhanced module of a particular base pipeline stage enhances one or more functions of the particular base pipeline stage.

13. The method of claim 1, wherein a base module of a particular enhanced pipeline stage enables data to pass through the particular enhanced pipeline stage without being changed.

14. A method for controlling a pipeline-based processor, the pipeline-based processor comprising at least one pipeline, the at least one pipeline at least including a particular pipeline, wherein the particular pipeline is partitioned into a plurality of pipeline stages based on one or more functions, the plurality of pipeline stages including one or more base pipeline stages and a plurality of enhanced pipeline stages, each enhanced pipeline stage configured to be either a shutdown enhanced pipeline stage or an activated enhanced pipeline stage, all functions of each shutdown enhanced pipeline stage being not activated, at least one function of each activated enhanced pipeline stage being activated, wherein at least one of the plurality of enhanced pipeline stages is configured to be activated while at least another of the plurality of enhanced pipeline stages is shut down, wherein each enhanced pipeline stage has an enhanced stage priority level of at least two different enhanced stage priority levels, at least one of the plurality of enhanced pipeline stages having a different enhanced stage priority level than at least one other of the plurality of enhanced pipeline stages, a particular pipeline stage of the plurality of pipeline stages including at least one base module and a plurality of enhanced modules, each base module of the at least one base module being a partitioned portion of the particular pipeline stage of the particular pipeline of the pipeline-based processor, each enhanced module of the plurality of enhanced modules being a partitioned portion of the particular pipeline stage of the particular pipeline of the pipeline-based processor, each of the at least one base module of the particular pipeline stage being activated while the particular pipeline stage is activated, each enhanced module of the particular pipeline stage having a particular priority level of at least two different enhanced module priority levels, at least one of the plurality of enhanced modules of the particular pipeline stage having a different priority level than at least one other of the plurality of enhanced modules, wherein at least one particular enhanced module of the plurality of enhanced modules of the particular pipeline stage is configured to be activated while at least another particular enhanced module of the plurality of enhanced modules of the particular pipeline stage is shut down, the method comprising:
determining an increase in a workload;
activating, by at least one controller circuit, one or more of the plurality of enhanced pipeline stages based on at least one corresponding enhanced stage priority level of the one or more of the plurality of enhanced pipeline stages and requirements for performance of the workload; and
activating, by the at least one controller circuit, one or more of the plurality of enhanced modules of the particular pipeline stage based on at least one corresponding enhanced module priority level of the one or more of the plurality of enhanced modules of the particular pipeline stage and the requirements for the performance of the workload.

15. The method of claim 14, wherein each enhanced module of the particular pipeline stage is determined to have one particular enhanced module priority level of the at least two different enhanced module priority levels according to a performance-to-power consumption ratio of that enhanced module of the particular pipeline stage, wherein a relatively high performance-to-power consumption ratio corresponds to a relatively high enhanced module priority level.

16. The method of claim 15, wherein activating, by the at least one controller circuit, the one or more of the plurality of enhanced modules of the particular pipeline stage based on the at least one corresponding enhanced module priority level of the one or more of the plurality of enhanced modules of the particular pipeline stage and the requirements for the performance of the workload further comprises:
activating, by the at least one controller circuit, two or more of the plurality of enhanced modules of the particular pipeline stage in a high-to-low order of the at least two different enhanced module priority levels when the workload increases based on at least two corresponding enhanced module priority levels of the two or more of the plurality of enhanced modules of the particular pipeline stage and the requirements for the performance of the workload.

17. A method for controlling a pipeline-based processor, the pipeline-based processor comprising at least one pipeline, the at least one pipeline at least including a particular pipeline, wherein the particular pipeline is partitioned into a plurality of pipeline stages based on one or more functions, the plurality of pipeline stages including one or more base pipeline stages and a plurality of enhanced pipeline stages, each enhanced pipeline stage configured to be either a shutdown enhanced pipeline stage or an activated enhanced pipeline stage, all functions of each shutdown enhanced pipeline stage being not activated, at least one function of each activated enhanced pipeline stage being activated, wherein at least one of the plurality of enhanced pipeline stages is configured to be activated while at least another of the plurality of enhanced pipeline stages is shut down, wherein each enhanced pipeline stage has an enhanced stage priority level of at least two different enhanced stage priority levels, at least one of the plurality of enhanced pipeline stages having a different enhanced stage priority level than at least one other of the plurality of enhanced pipeline stages, a particular pipeline stage of the plurality of pipeline stages including at least one base module and a plurality of enhanced modules, each base module of the at least one base module being a partitioned portion of the particular pipeline stage of the particular pipeline of the pipeline-based processor, each enhanced module of the plurality of enhanced modules being a partitioned portion of the particular pipeline stage of the particular pipeline of the pipeline-based processor, each of the at least one base module of the particular pipeline stage being activated while the particular pipeline stage is activated, each enhanced module of the particular pipeline stage having a particular priority level of at least two different enhanced module priority levels, at least one of the plurality of enhanced modules of the particular pipeline stage having a different priority level than at least one other of the plurality of enhanced modules, wherein at least one particular enhanced module of the plurality of enhanced modules of the particular pipeline stage is configured to be activated while at least another particular enhanced module of the plurality of enhanced modules of the particular pipeline stage is shut down, the method comprising:

determining a decrease in a workload;

shutting down, by at least one controller circuit, one or more of the plurality of enhanced pipeline stages based on at least one corresponding enhanced stage priority level of the one or more of the plurality of enhanced pipeline stages and requirements for performance of the workload; and shutting down, by the at least one controller circuit, one or more of the plurality of enhanced modules of the particular pipeline stage based on at least one corresponding enhanced module priority level of the one or more of the plurality of enhanced modules of the particular pipeline stage and the requirements for the performance of the workload.

18. The method of claim 17, wherein each enhanced module of the particular pipeline stage is determined to have one particular enhanced module priority level of the at least two different enhanced module priority levels according to a performance-to-power consumption ratio of that enhanced module of the particular pipeline stage, wherein a relatively high performance-to-power consumption ratio corresponds to a relatively high enhanced module priority level.

19. The method of claim 18, wherein shutting down, by the at least one controller circuit, the one or more of the plurality of enhanced modules of the particular pipeline stage based on the at least one corresponding enhanced module priority level of the one or more of the plurality of enhanced modules of the particular pipeline stage and the requirements for the performance of the workload further comprises:

shutting down, by the at least one controller circuit, two or more of the plurality of enhanced modules of the particular pipeline stage in a low-to-high order of the at least two different enhanced module priority levels when the workload decreases based on at least two corresponding enhanced module priority levels of the two or more of the plurality of enhanced modules of the particular pipeline stage and the requirements for the performance of the workload.

20. The method of claim 18, further comprising:

accessing, by the at least one controller circuit, a memory means for storing priority level information of the plurality of enhanced modules of the particular pipeline stage.

* * * * *